Patented Mar. 8, 1927.

1,620,490

UNITED STATES PATENT OFFICE.

GEORGE E. SANDERS, OF DELORO, ONTARIO, CANADA, ASSIGNOR TO RICHES, PIVER & CO., A CORPORATION OF NEW JERSEY.

COPPER-LIME DUST.

No Drawing. Original application filed December 23, 1920, Serial No. 432,692, Patent No. 1,541,753. Divided and this application filed August 9, 1924. Serial No. 731,202.

This application is a division of my copending application filed Dec. 23, 1920, Ser. No. 432,692 and now issued Patent No. 1,541,753, dated June 9, 1925.

The object of this invention is to produce a dry powder suitable for dusting on foliage as a fungicide or a combined fungicide and insecticide.

Copper is a recognized basis for a fungicide, being used in various forms, such as copper hydroxide, copper sulphate, copper carbonate, etc. Other metals such as nickel, cobalt, silver, zinc and, to a lesser extent, aluminum, are also known to possess fungicidal properties.

Dusting or the application of a fungicide in powdered form possesses numerous advantages over liquid spraying and is more efficient.

I prefer to use copper sulphate, although other salts of copper, or a salt of other metals having fungicidal value, such as nickel, may be used.

In addition to the cost of the former types of dust being much higher than the one that I will herein describe, the former types of dust lack flexibility. In other words, in the dried and milled Bordeaux powder a moderate or a high degree of effectiveness can be attained by proper manipulation of the ingredients but they can not be made as highly active as a freshly made Bordeaux.

The dust herein described not only has the advantage of much lower cost than the dusts heretofore used but the form of the final copper salt obtained can be varied by slight manipulation from the most active to the most inert form, as desired, for use on different types of foliage or disease.

My procedure is as follows:

Quick lime, in either powdered, granulated, crushed or lump form, is placed in a mixer or hydrator. Sufficient water is added so that it, together with the water of crystallization in the copper sulphate, is enough, to hydrate the lime.

While the lime is hydrating or slaking, copper sulphate is added to it in the mixer. If the copper sulphate is added after the hydrating lime has begun to cool and the batch agitated or stirred for a short time and then dumped on a cooling floor before grinding, the resulting dust will be almost white but will have a blue color when moisture is present. The copper sulphate in this type of dust is as active as in a freshly made Bordeaux. To make a safer and more inert type of dust, the copper sulphate is preferably added earlier during the process of hydration of the lime or by stirring for a longer time with the lime before the cooling. By such manipulation and so subjecting the copper salt to the various temperatures present during the hydrating of the lime and adding the salt either in solution or as crystals, or merely grinding the crystals with the quicklime or partially hydrated lime, any type of copper salt, from monohydrated copper sulphate, brown copper hydroxide or copper oxide may be made, with as many degrees of safety to foliage and equal variations in activity in the control of fungus.

I prefer to use quicklime but barium or magnesium oxide may be substituted. I prefer fine crystal copper sulphate, but medium or coarse crystals or a solution of the same can be used, depending on the product desired. Salts of nickel, aluminum, cobalt, zinc, silver, etc., may be substituted for the copper, and carbonates, acetates or other salts may be substituted for the sulphate form.

If a combined fungicide and insecticide is desired, an arsenical insecticide, such as lead arsenate, calcium arsenate, zinc arsenate, Paris green, etc. may be added or mixed with the dust either before or after grinding.

The dry powder formed may be used direct or ground in a suitable mill in order to secure a desired stage of fine division.

The form of dry powdered product produced by this process is much more effective than a mixture of dehydrated copper sulphate which has been dehydrated by subjecting to artificial heat and then mixed with hydrated lime, in the usual manner. In the process forming the subject of the present application, the action of the hydrating quick lime which simultaneously extracts water of crystallization from the copper salt, produces a product which is much more effective and which posseses many desired qualities as a fungicide. I prefer to control the processing, in the manner heretofore described, so as to produce the monohydrated form of the dehydrated copper sulphate, mixed with hydrated quick lime, as this product is very efficient as a fungicide and is adapted for use on many varieties of plant foliage for the control of fungus diseases.

What I claim and desire to secure by Letters Patent is:—

1. A method of producing a fungicide which comprises the bringing together of quick lime, water and a hydrated copper salt in crystal form, the copper salt being added while the lime is hydrating and the amount of water being controlled to cause the copper salt to be dehydrated to a predetermined degree by the action of the hydrating lime, to produce a dry powdered product.

2. A method of producing a fungicide which comprises the bringing together of quick lime, water and a hydrated metallic salt having a fungicidal value, the salt being added while the lime is hydrating and the amount of water being controlled to cause the salt to be dehydrated to a predetermined degree by the action of the hydrating lime, to produce a dry powdered product.

3. A method of producing a fungicide which comprises the bringing together of quick lime, water and polyhydrated copper sulphate in crystal form, the copper sulphate being added while the lime is hydrating and the amount of water being controlled to cause the copper sulphate to be dehydrated to the monohydrated form by the action of the hydrating lime and producing the product in a dry powdered form.

4. A method of producing a fungicide which comprises dehydrating copper salts by adding copper sulphate crystals to slaking lime.

5. A method of producing a fungicide which comprises dehydrating copper salts by grinding together copper sulphate crystals and quicklime.

6. A dry powder suitable for dusting, composed of a metallic salt having fungicidal value which has been dehydrated to a predetermined degree by the action of hydrating quick lime thereon, and the simultaneously produced hydrated lime.

Signed at Medina, in the county of Orleans, State of New York this 6th day of August A. D. 1924.

GEORGE E. SANDERS.